United States Patent
Huang

(10) Patent No.: US 10,866,391 B2
(45) Date of Patent: Dec. 15, 2020

(54) IMAGING LENS ASSEMBLY

(71) Applicant: Zhejiang Sunny Optical Co., Ltd, Zhejiang (CN)

(72) Inventor: Lin Huang, Zhejiang (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 140 days.

(21) Appl. No.: 16/211,443

(22) Filed: Dec. 6, 2018

(65) Prior Publication Data

US 2019/0107689 A1    Apr. 11, 2019

Related U.S. Application Data

(63) Continuation of application No. PCT/CN2018/077205, filed on Feb. 26, 2018.

(30) Foreign Application Priority Data

Jul. 25, 2017  (CN) ..................... 2017 1 0611433 U
Jul. 25, 2017  (CN) ..................... 2017 2 0905647 U

(51) Int. Cl.
*G02B 13/18* (2006.01)
*G02B 9/34* (2006.01)
*G02B 13/00* (2006.01)

(52) U.S. Cl.
CPC ............. *G02B 13/004* (2013.01); *G02B 9/34* (2013.01)

(58) Field of Classification Search
CPC ................................. G02B 13/004; G02B 9/34
USPC .......... 359/715, 753, 771, 781, 783
See application file for complete search history.

(56) References Cited

U.S. PATENT DOCUMENTS

| 2004/0150893 | A1  | 8/2004  | Shinohara |
| 2007/0279761 | A1* | 12/2007 | Yamamoto ............ G02B 13/04 359/684 |
| 2010/0208363 | A1  | 8/2010  | Yasuhiko et al. |
| 2011/0090575 | A1* | 4/2011  | Mori .................... G02B 13/004 359/717 |
| 2012/0188657 | A1  | 7/2012  | Hsu et al. |
| 2012/0300316 | A1  | 11/2012 | Tsai et al. |
| 2017/0108666 | A1* | 4/2017  | Lee .................... G02B 13/0045 |

FOREIGN PATENT DOCUMENTS

| CN | 101762867   | 6/2010 |
| CN | 201903687   | 7/2011 |
| CN | 201984203   | 9/2011 |
| CN | 205958827   | 2/2017 |
| CN | 106526804   | 3/2017 |
| CN | 106707468   | 5/2017 |
| CN | 206209180   | 5/2017 |
| CN | 107219610   | 9/2017 |
| JP | 2013120193  | 6/2013 |

* cited by examiner

*Primary Examiner* — William Choi
(74) *Attorney, Agent, or Firm* — Hauptman Ham, LLP

(57) ABSTRACT

The present disclosure discloses an imaging lens assembly. The imaging lens assembly includes, sequentially along an optical axis from an object side to an image side, a first lens, a second lens, a third lens, and a fourth lens. The object-side surface of the first lens is a concave surface, and the image-side surface of the fourth lens is a concave surface. The second lens has a positive refractive power. At least one of the first lens, the third lens, or the fourth lens has a negative refractive power. An effective focal length f3 of the third lens and an effective focal length f4 of the fourth lens satisfy: f3/f4>0.

18 Claims, 6 Drawing Sheets

IMAGING LENS ASSEMBLY

CROSS-REFERENCE TO RELATED APPLICATIONS

This application is a continuation of International Application No. PCT/CN2018/077205, filed on Feb. 26, 2018, which claims the priorities and rights to Chinese Patent Application No. 201710611433.4, filed with the China National Intellectual Property Administration (CNIPA) on Jul. 25, 2017, and Chinese Patent Application No. 201720905647.8, filed with the CNIPA on Jul. 25, 2017. All of the aforementioned applications are hereby incorporated by reference in their entireties.

TECHNICAL FIELD

The present disclosure relates to an imaging lens assembly, and more specifically to a wide-angle imaging lens assembly with large aperture including four lenses.

BACKGROUND

As the improving in performance and reducing in size of the often used photosensitive elements such as charge-coupled device elements (CCD) or complementary metal-oxide semiconductor elements (CMOS), the improvement in performance and reduction in size of the photosensitive elements put fordward higher requirements on the high imaging quality and miniaturization of the counterpart imaging lens assemblies.

Meanwhile, the continuously development of the portable electronic products such as smart phones and depth detection cameras also puts fordward higher requirements on high imaging quality and miniaturization of imaging lens assemblies. To satisfy requirements of compact structure and the high imaging quality, a typical configuration of the existing lens assembly has an F-number Fno (total effective focal length of the lens assembly/entrance pupil diameter of the lens assembly) of 2.0 or above. However, in situations such as insufficient lighting (e.g., cloudy and rainy days, or at dusk) or hand trembling, the lens assembly needs a large amount of light admitted to ensure the imaging quality. In such cases, the lens assembly having the F-number Fno of 2.0 or above is unable to meet the higher imaging requirements.

SUMMARY

The present disclosure provides an imaging lens assembly such as a wide-angle lens assembly having a large aperture, which may be applicable to portable electronic products and may at least or partially solve at least one of the above disadvantages in the existing technology.

According to an aspect, the present disclosure provides an imaging lens assembly. The imaging lens assembly includes, sequentially along an optical axis from an object side to an image side, a first lens, a second lens, a third lens, and a fourth lens. An object-side surface of the first lens may be a concave surface, and an image-side surface of the fourth lens may be a concave surface. The second lens may have a positive refractive power. At least one of the first lens, the third lens, or the fourth lens may have a negative refractive power. An effective focal length f3 of the third lens and an effective focal length f4 of the fourth lens may satisfy: f3/f4>0.

In an implementation, the effective focal length f3 of the third lens and the effective focal length f4 of the fourth lens may satisfy: 0<f3/f4<1.

In an implementation, a total effective focal length f of the imaging lens assembly and an entrance pupil diameter EPD of the imaging lens assembly may satisfy: f/EPD<2.

In an implementation, half of a diagonal length ImgH of an effective pixel area on an image plane of the imaging lens assembly and the total effective focal length f of the imaging lens assembly may satisfy: ImgH/f>1.

In an implementation, the effective focal length f3 of the third lens and the total effective focal length f of the imaging lens assembly satisfy: 1.2<|f3/f|<2.3.

In an implementation, the first lens may have a negative refractive power.

In an implementation, a combined refractive power of the first lens and the second lens may be a negative refractive power. A combined focal length f12 of the first lens and the second lens and the total effective focal length f of the imaging lens assembly may satisfy: −8<f12/f<−3.

In an implementation, a radius of curvature R3 of an object-side surface of the second lens and a radius of curvature R6 of an image-side surface of the third lens may satisfy: −1.2<R3/R6<−0.5.

In an implementation, an object-side surface of the fourth lens may be a convex surface.

In an implementation, at least one of an image-side surface or the object-side surface of the first lens may have at least one inflection point.

In an implementation, the radius of curvature R6 of the image-side surface of the third lens and the total effective focal length f of the imaging lens assembly may satisfy: −1.2<R6/f<−0.7.

In an implementation, the radius of curvature R6 of the image-side surface of the third lens and the effective focal length f3 of the third lens may satisfy: −1<R6/f3<−0.5.

In an implementation, an edge thickness ET4 of the fourth lens and a center thickness CT4 of the fourth lens on the optical axis may satisfy: 0.3<ET4/CT4<0.9.

According to an aspect, the present disclosure provides an imaging lens assembly. The imaging lens assembly includes, sequentially along an optical axis from an object side to an image side, a first lens, a second lens, a third lens, and a fourth lens. The first lens may have a positive refractive power or a negative refractive power, and an object-side surface of the first lens may be a concave surface. The second lens may have a positive refractive power. The third lens has a positive refractive power or a negative refractive power. The fourth lens has a positive refractive power or a negative refractive power, and an image-side surface of the fourth lens may be a concave surface. A combined refractive power of the first lens and the second lens may be a negative refractive power. A combined focal length f12 of the first lens and the second lens and a total effective focal length f of the imaging lens assembly may satisfy: −8<f12/f<−3.

In an implementation, an effective focal length f3 of the third lens and the total effective focal length f of the imaging lens assembly may satisfy: 1.2<|f3/f|<2.3.

In an implementation, the effective focal length f3 of the third lens and an effective focal length f4 of the fourth lens may satisfy: f3/f4>0.

In an implementation, each of the third lens and the fourth lens may have a positive refractive power.

In an implementation, the effective focal length f3 of the third lens and the effective focal length f4 of the fourth lens may satisfy: 0<f3/f4<1.

In an implementation, a radius of curvature R3 of an object-side surface of the second lens and a radius of curvature R6 of an image-side surface of the third lens may satisfy: $-1.2<R3/R6<-0.5$.

In an implementation, at least one of an image-side surface or the object-side surface of the first lens may have at least one inflection point.

In an implementation, the object-side surface of the second lens may be a convex surface, and the image-side surface of the third lens may be a convex surface.

In an implementation, an object-side surface of the fourth lens may be a convex surface.

In an implementation, the radius of curvature R6 of the image-side surface of the third lens and the total effective focal length f of the imaging lens assembly may satisfy: $-1.2<R6/f<-0.7$.

In an implementation, the radius of curvature R6 of the image-side surface of the third lens and the effective focal length f3 of the third lens may satisfy: $-1<R6/f3<-0.5$.

In an implementation, an edge thickness ET4 of the fourth lens and a center thickness CT4 of the fourth lens on the optical axis may satisfy: $0.3<ET4/CT4<0.9$.

In an implementation, half of a diagonal length ImgH of an effective pixel area on an image plane of the imaging lens assembly and the total effective focal length f of the imaging lens assembly may satisfy: $ImgH/f>1$.

In an implementation, the total effective focal length f of the imaging lens assembly and an entrance pupil diameter EPD of the imaging lens assembly may satisfy: $f/EPD<2$.

According to an aspect, the present disclosure provides an imaging lens assembly. The imaging lens assembly includes, sequentially along an optical axis from an object side to an image side, a first lens, a second lens, a third lens, and a fourth lens. The first lens may have a positive refractive power or a negative refractive power, and an object-side surface of the first lens may be a concave surface. The second lens may have a positive refractive power. The third lens has a positive refractive power or a negative refractive power. The fourth lens has a positive refractive power or a negative refractive power, and an image-side surface of the fourth lens may be a concave surface. An edge thickness ET4 of the fourth lens and a center thickness CT4 of the fourth lens on the optical axis may satisfy: $0.3<ET4/CT4<0.9$.

In the present disclosure, multiple lenses (e.g., four lenses) are used. By reasonably distributing the refractive powers and the surface types of the lenses, the center thicknesses of the lenses, the spacing distances on the axis between the lenses, etc., in the process of increasing the amount of the light admitted, the system has a large-aperture advantage, thereby improving the imaging effect in a dark environment while improving edge ray aberrations. Meanwhile, the imaging lens assembly with the above configuration may have at least one of the beneficial effects: ultra-thin, miniaturization, large-aperture, low sensitivity, wide-angle, high relative illuminance, or high image quality.

BRIEF DESCRIPTION OF THE DRAWINGS

By describing non-limiting implementations below in detail with reference to the accompanying drawings, other features, objectives and advantages of the present disclosure will be more apparent. In the accompanying drawings.

DETAILED DESCRIPTION OF EMBODIMENTS

Figure 1:
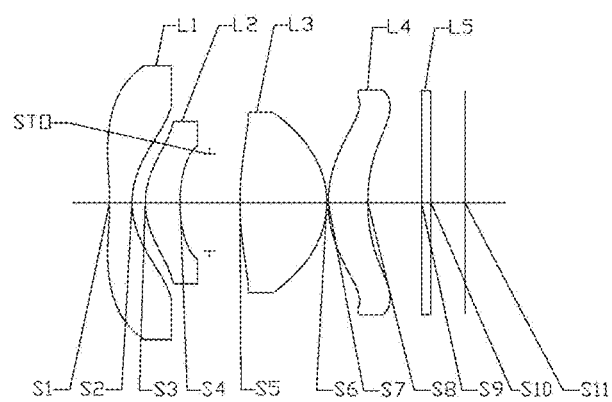
FIG. 1 is a schematic structural diagram illustrating an imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the feature. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area. If a surface of a lens is a concave surface and a position of the concave surface is not defined, it indicates that the surface of the lens is a concave surface at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

An imaging lens assembly according to exemplary implementations of the present disclosure includes, for example, four lenses (i.e., a first lens, a second lens, a third lens, and a fourth lens) having refractive powers. The imaging lens assembly may further include a photosensitive element disposed at the image plane.

The first lens has a positive refractive power or a negative refractive power, and an object-side surface of the first lens may be a concave surface. The second lens may have a positive refractive power. The third lens has a positive refractive power or a negative refractive power. The fourth lens has a positive refractive power or a negative refractive power, and an image-side surface of the fourth lens may be a concave surface.

Alternatively, at least one of the image-side surface or the object-side surface of the first lens has at least one inflection point. By reasonably controlling the surface types of the first lens, the total size of the lens assembly is compressed, thereby achieving miniaturization of the lens assembly.

Alternatively, an object-side surface of the fourth lens may be a convex surface. The object-side surface of the fourth lens is configured to be a convex surface, which is conducive to reducing a chief ray angle and improving relative illuminance on the image plane.

In some implementations, the first lens may have a negative refractive power. A combined refractive power of the first lens and the second lens may be a negative refractive power. A combined focal length f12 of the first lens and the second lens and a total effective focal length f of the imaging lens assembly may satisfy: $-8<f12/f<-3$, and more specifi-cally, f12 and f may further satisfy: $-7.56 \leq f12/f \leq -3.05$. By reasonably allocating f12 and f, resolution of the lens assembly may be improved.

An effective focal length f3 of the third lens and the total effective focal length f of the imaging lens assembly may satisfy: $1.2<|f3/f|<2.3$, and more specifically, f3 and f may further satisfy: $1.35 \leq |f3/f| \leq 2.19$. By reasonably controlling the range of the positive refractive power or negative refractive power of the third lens, it is conducive to achieving wide-angle of the lens assembly.

The effective focal length f3 of the third lens and the effective focal length f4 of the fourth lens may satisfy: $f3/f4>0$, and more specifically, f3 and f4 may further satisfy: $0<f3/f4<1$, for example, $0.24 \leq f3/f4 \leq 0.66$. Alternatively, each of the third lens and the fourth lens may have a positive refractive power.

A radius of curvature R3 of the object-side surface of the second lens and a radius of curvature R6 of the image-side surface of the third lens may satisfy: $-1.2<R3/R6<-0.5$, and more specifically, R3 and R6 may further satisfy: $-1.00 \leq R3/R6 \leq -0.71$. By reasonably controlling the radius of curvature of the object-side surface of the second lens and the radius of curvature of the image-side surface of the third lens, a sensitivity of a system may effectively be reduced. Satisfying the conditional expression $-1.2<R3/R6<-0.5$ is also conducive to achieving large aperture and high resolution.

The radius of curvature R6 of the image-side surface of the third lens and the total effective focal length f of the imaging lens assembly may satisfy: $-1.2<R6/f<-0.7$, and more specifically, R6 and f may further satisfy: $-1.13 \leq R6/f \leq -0.84$. By controlling the ratio of R6 to f within a reasonable range, it may effectively improve the resolution of the lens assembly, and enhance the relative illuminance on the image plane.

The radius of curvature R6 of the image-side surface of the third lens and the effective focal length f3 of the third lens may satisfy: $-1<R6/f3<-0.5$, and more specifically, R6 and f3 may further satisfy: $-0.64 \leq R6/f3 \leq -0.51$. By controlling the ratio of R6 to f3 within a reasonable range, it may effectively improve the resolution of the lens assembly, and enhance the relative illuminance on the image plane.

The edge thickness ET4 of the fourth lens and the center thickness CT4 of the fourth lens on the optical axis may satisfy: $0.3<ET4/CT4<0.9$, and more specifically, ET4 and CT4 may further satisfy: $0.31 \leq ET4/CT4 \leq 0.82$. By controlling the ratio of ET4 to CT4 within a reasonable range, it may effectively reduce the chief ray angle, and enhance the relative illuminance on the image plane.

The total effective focal length f of the imaging lens assembly and an entrance pupil diameter EPD of the imaging lens assembly may satisfy: $f/EPD<2$, and more specifically, f and EPD may further satisfy: $f/EPD<1.3$, for example, $1.18 \leq f/EPD \leq 1.19$. By reducing the F-number Fno (the total effective focal length f of the lens assembly/the entrance pupil diameter EPD of the lens assembly), brightness of the image plane may effectively be improved, so that the lens assembly can better satisfy shooting requirements when the light is insufficient. When the conditional expression $f/EPD<2$ is satisfied, the lens assembly may have a large-aperture advantage in the process of increasing the amount of light admitted, thereby improving the imaging effect in a dark environment while improving edge ray aberrations.

Half of a diagonal length ImgH of an effective pixel area of the photosensitive element on the image plane of the imaging lens assembly and the total effective focal length f of the imaging lens assembly may satisfy: $ImgH/f>1$, and more specifically, ImgH and f may further satisfy: $1.15 \leq \text{ImgH}/f \leq 1.30$. Accordingly, imaging of the large object-side space by the photosensitive element is achieved.

The imaging lens assembly with the above configuration may have a large field-of-view. For example, half of a maximal field-of-view HFOV may satisfy: $51.77° \leq \text{HFOV} \leq 55.86°$, which represents a wide-angle characteristic of the lens assembly.

In the exemplary implementations, the optical imaging lens assembly may also be provided with at least one diaphragm. The diaphragm may be disposed at any position between the object side and the image side as needed. For example, the diaphragm may be disposed between the second lens and the third lens to improve the imaging quality of the lens assembly. Alternatively, the object-side surface of the second lens may be a convex surface, and the image-side surface of the third lens may be a convex surface. With such configuration, the second lens and the third lens form an approximately symmetrical structure centering on the diaphragm, so that the sensitivity of the lens assembly can effectively be reduced.

Alternatively, the optical imaging lens assembly may further include an optical filter for correcting color deviations and/or a protective glass for protecting the photosensitive element on the image plane.

The imaging lens assembly described above adopts, for example, four lenses, which may effectively avoid the problem of excessive volume and excessive weight caused by the excessive amount of lense, and may be conducive to achieving the miniaturization and light-weight of the lens assembly. By reasonably distributing the refractive powers, the surface types of the lenses, the center thicknesses of the lenses, and the spacing distances on the axis between the lenses, etc., the sensitivity of the lens assembly is reduced and the processability of the lens assembly is improved while the miniaturization of the lens assembly is ensured, thereby making the imaging lens assembly more conducive to the production and processing and applicable to the portable electronic products. In addition, the imaging lens assembly with the above configuration may further have beneficial effects such as ultra-thin, large-aperture, wide-angle, high relative illuminance, or high image quality.

In the implementations of the present disclosure, each of the lenses may adopt an aspheric lens, to improve distortion aberrations and astigmatic aberrations, to further improve the image quality.

However, it should be understood by those skilled in the art that the various results and advantages described in the present specification may be obtained by changing the number of the lenses constituting the lens assembly without departing from the technical solution claimed by the present disclosure. For example, although the imaging lens assembly having four lenses is described as an example in the implementations, the imaging lens assembly is not limited to include four lenses. If desired, the imaging lens assembly may also include other numbers of lenses.

Specific embodiments of the imaging lens assembly that may be applied to the above implementations are further described below with reference to the accompanying drawings.

Embodiment 1

An imaging lens assembly according to Embodiment 1 of the present disclosure is described below with reference to FIGS. 1-2C. FIG. 1 is a schematic structural diagram illustrating the imaging lens assembly according to Embodiment 1 of the present disclosure.

As shown in FIG. 1, the imaging lens assembly includes, sequentially along an optical axis from an object side to an image side, a first lens L1, a second lens L2, a third lens L3, a fourth lens L4, and an image plane S11. The imaging lens assembly may further include a photosensitive element disposed on the image plane S11.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the imaging lens assembly may further include an optical filter L5 having an object-side surface S9 and an image-side surface S10. Light from an object sequentially passes through the surfaces S1-S10 and finally forms an image on the image plane S11.

Alternatively, the imaging lens assembly may further include a diaphragm STO disposed between the second lens L2 and the third lens L3, to improve the imaging quality of the imaging lens assembly.

Table 1 shows the surface type, the radius of curvature, the thickness, the material and the conic coefficient of each lens of the imaging lens assembly in Embodiment 1. The units of the radius of curvature and the thickness both are millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| S1 | aspheric | −6.5262 | 0.5000 | 1.53 | 55.8 | −1.1828 |
| S2 | aspheric | 1.7792 | 0.2922 | | | −0.5958 |
| S3 | aspheric | 1.5810 | 0.7883 | 1.62 | 23.5 | −0.5190 |
| S4 | aspheric | 3.5129 | 0.6523 | | | 5.8825 |
| STO | spherical | infinite | 0.6796 | | | |
| S5 | aspheric | 6.7878 | 1.9290 | 1.53 | 55.8 | 7.8345 |
| S6 | aspheric | −1.9843 | 0.0300 | | | −0.4399 |
| S7 | aspheric | 2.5469 | 0.8790 | 1.53 | 55.8 | −0.7552 |
| S8 | aspheric | 4.1501 | 1.1924 | | | −0.9998 |
| S9 | spherical | infinite | 0.2100 | 1.52 | 64.2 | |
| S10 | spherical | infinite | 0.7688 | | | |
| S11 | spherical | infinite | | | | |

The radius of curvature R3 of the object-side surface S3 of the second lens L2 and the radius of curvature R6 of the image-side surface S6 of the third lens L3 satisfy: R3/R6=−0.80.

In this embodiment, each of the lenses may adopt an aspheric lens, and the surface type x of each aspheric surface is defined by the following formula:

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows the high-order coefficients $A_4, A_6, A_8, A_{10}, A_{12}, A_{14}$, and $A_{16}$ applicable to the aspheric surfaces S1-S8 in Embodiment 1.

The total effective focal length f of the imaging lens assembly and the entrance pupil diameter EPD of the imaging lens assembly satisfy: f/EPD=1.18. The combined focal length f12 of the first lens L1 and the second lens L2 and the total effective focal length f of the imaging lens assembly satisfy: f12/f=−3.43.

Figure 2A:
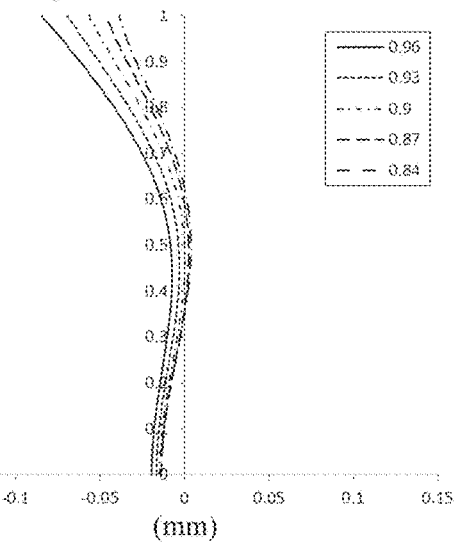
FIGS. 2A-2C respectively illustrate a longitudinal aberration curve, an astigmatic curve, and a distortion curve of the imaging lens assembly according to Embodiment 1.
Figure 2B:
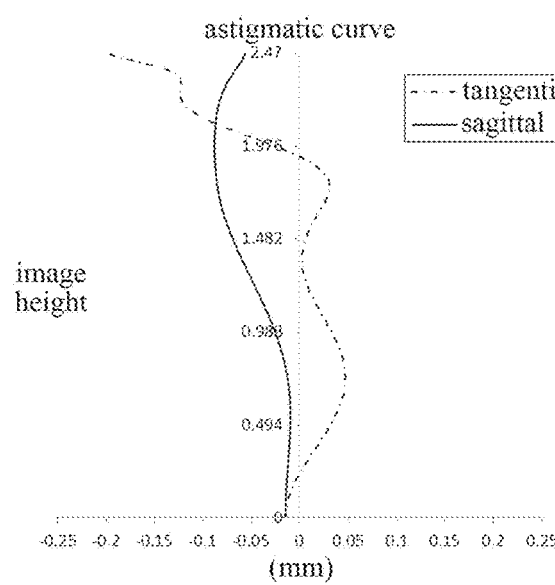
Figure 2C:
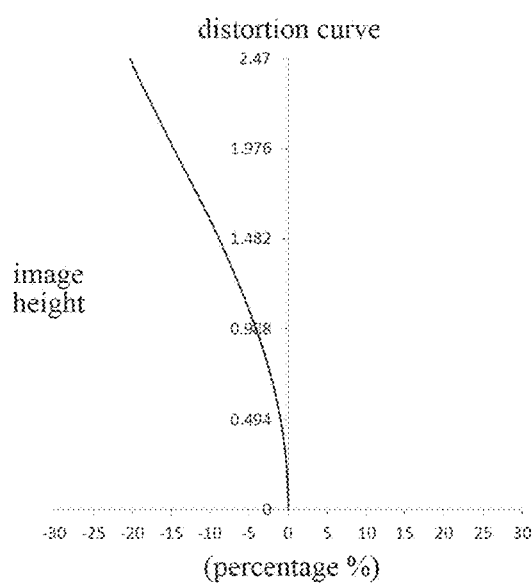

FIG. 2A illustrates the longitudinal aberration curve of the imaging lens assembly according to Embodiment 1, representing deviations of focal points of light of different wavelengths converged after passing through a lens assembly. FIG. 2B illustrates the astigmatic curve of the imaging lens assembly according to Embodiment 1, representing a curvature of the tangential image plane and a curvature of the sagittal image plane. FIG. 2C illustrates the distortion curve of the imaging lens assembly according to Embodiment 1, representing amounts of distortion at different viewing angles. It can be seen from FIGS. 2A-2C that the imaging lens assembly according to Embodiment 1 can achieve a good imaging quality.

Embodiment 2

An imaging lens assembly according to Embodiment 2 of the present disclosure is described below with reference to

TABLE 2

| surface number | A4 | A6 | A8 | A10 | A12 | A14 | A16 |
|---|---|---|---|---|---|---|---|
| S1 | 4.6565E−02 | −1.2346E−02 | 2.6572E−03 | −3.6600E−04 | 2.9845E−05 | −1.2020E−06 | 1.6047E−08 |
| S2 | −1.6600E−02 | −9.9701E−04 | −1.0623E−03 | 1.0405E−04 | −1.1247E−05 | 2.8602E−06 | −2.2894E−08 |
| S3 | −4.0374E−02 | −6.4001E−03 | −1.0090E−03 | 5.7484E−04 | −1.0708E−04 | 8.5116E−06 | −2.7237E−07 |
| S4 | 3.1995E−02 | −2.7903E−02 | 2.1654E−02 | −1.5988E−02 | 1.0724E−02 | −3.3603E−03 | 4.1412E−04 |
| S5 | −3.8059E−03 | −4.0681E−03 | 8.9439E−04 | −1.1164E−05 | −4.5239E−05 | 9.2240E−06 | −7.2005E−07 |
| S6 | −3.2191E−04 | −4.1794E−03 | 3.9007E−03 | −1.5447E−03 | 3.3799E−04 | −3.9375E−05 | 1.9906E−06 |
| S7 | 1.7018E−04 | −6.8679E−04 | −1.0677E−03 | 3.7318E−04 | −7.6404E−05 | 7.0128E−06 | −2.7388E−07 |
| S8 | 2.3619E−02 | −8.0231E−03 | 1.2472E−03 | −2.9155E−04 | 3.7951E−05 | −2.3942E−06 | 5.6877E−08 |

Table 3 below shows the total effective focal length f of the imaging lens assembly, the effective focal lengths f1-f4 of the lenses, the half of the diagonal length ImgH of the effective pixel area of the photosensitive element on the image plane S11 of the imaging lens assembly, the half of the maximal field-of-view HFOV of the imaging lens assembly, and the F-number Fno (i.e., f/EPD) of the imaging lens assembly in Embodiment 1.

TABLE 3

| | parameter | | | | | | |
|---|---|---|---|---|---|---|---|
| | f (mm) | f1 (mm) | f2 (mm) | f3 (mm) | f4 (mm) | ImgH (mm) | HFOV (°) | Fno |
| numerical value | 2.10 | −2.57 | 4.02 | 3.12 | 10.39 | 2.47 | 55.86 | 1.18 |

The effective focal length f3 of the third lens L3 and the effective focal length f4 of the fourth lens L4 satisfy: f3/f4=0.30. The effective focal length f3 of the third lens L3 and the total effective focal length f of the imaging lens assembly satisfy: |f3/f|=1.49. The half of the diagonal length ImgH of the effective pixel area of the photosensitive element on the image plane S11 of the imaging lens assembly and the total effective focal length f of the imaging lens assembly satisfy: ImgH/f=1.18. The radius of curvature R6 of the image-side surface S6 of the third lens and the total effective focal length f of the imaging lens assembly satisfy: R6/f=−0.95. The radius of curvature R6 of the image-side surface S6 of the third lens and the effective focal length f3 of the third lens L3 satisfy: R6/f3=−0.64.

Figure 3:
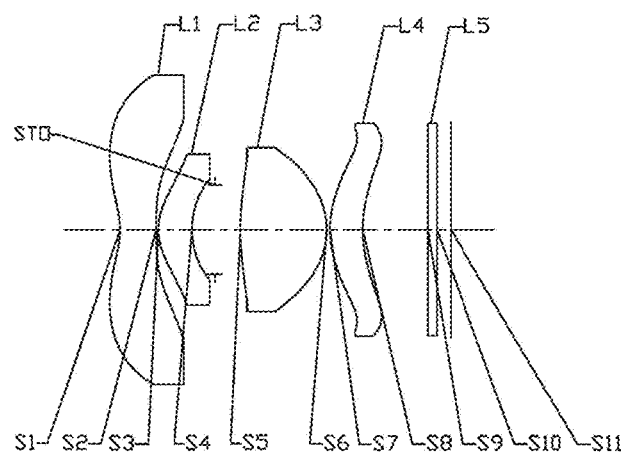
FIG. 3 is a schematic structural diagram illustrating an imaging lens assembly according to Embodiment 2 of the present disclosure.
Figure 4A:
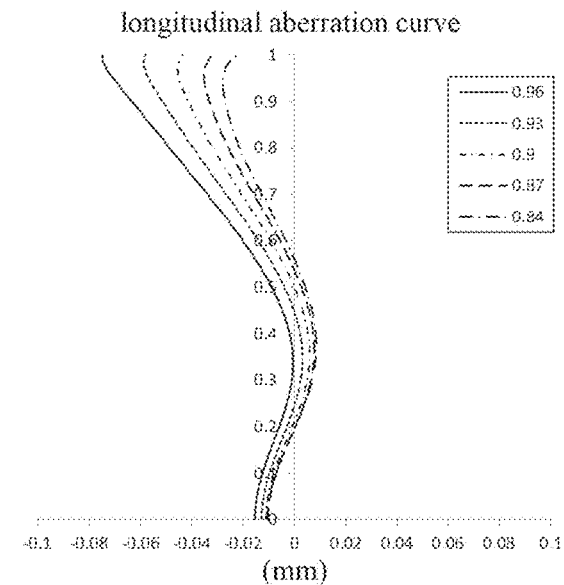
FIGS. 4A-4C respectively illustrate a longitudinal aberration curve, an astigmatic curve, and a distortion curve of the imaging lens assembly according to Embodiment 2.
Figure 4B:
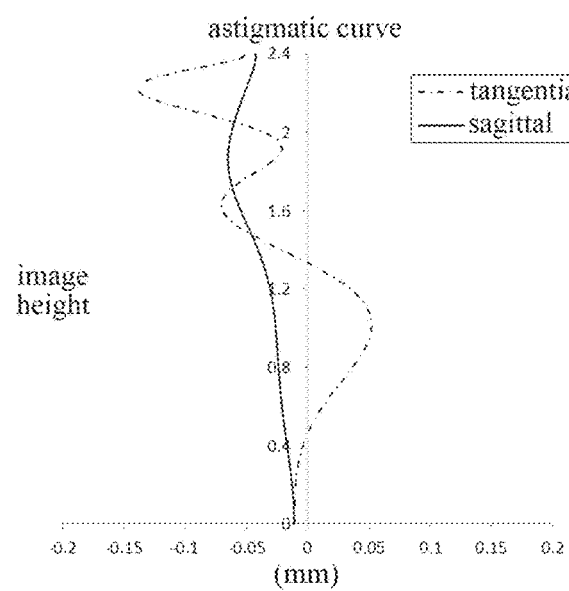
Figure 4C:
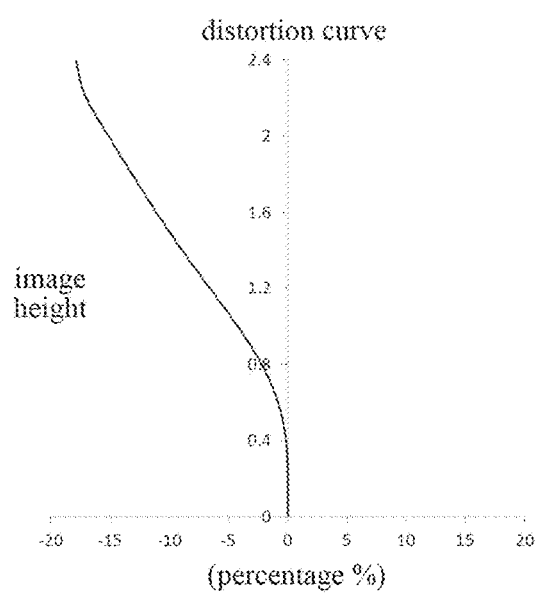

FIGS. 3-4C. In this embodiment and the following embodiments, for the purpose of brevity, the description of parts similar to those in Embodiment 1 will be omitted. FIG. 3 is a schematic structural diagram illustrating the imaging lens assembly according to Embodiment 2 of the present disclosure.

As shown in FIG. 3, the imaging lens assembly includes, sequentially along an optical axis from an object side to an image side, a first lens L1, a second lens L2, a third lens L3, a fourth lens L4, and an image plane S11. The imaging lens assembly may further include a photosensitive element disposed on the image plane S11.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the imaging lens assembly may further include an optical filter L5 having an object-side surface S9 and an image-side surface S10. Light from an object sequentially passes through the surfaces S1-S10 and finally forms an image on the image plane S11.

Alternatively, the imaging lens assembly may further include a diaphragm STO disposed between the second lens L2 and the third lens L3, to improve the imaging quality of the imaging lens assembly.

Table 4 shows the surface type, the radius of curvature, the thickness, the material and the conic coefficient of each lens of the imaging lens assembly in Embodiment 2. The units of the radius of curvature and the thickness are both millimeters (mm). Table 5 shows the high-order coefficients applicable to each aspheric mirror surface in Embodiment 2. The surface type of each aspheric surface may be defined by the formula (1) given in Embodiment 1. Table 6 shows the total effective focal length f of the imaging lens assembly, the effective focal lengths f1-f4 of the lenses, the half of the diagonal length ImgH of the effective pixel area of the photosensitive element on the image plane S11 of the imaging lens assembly, the half of the maximal field-of-view HFOV of the imaging lens assembly, and the F-number Fno of the imaging lens assembly in Embodiment 2.

TABLE 6

| parameter | f (mm) | f1 (mm) | f2 (mm) | f3 (mm) | f4 (mm) | ImgH (mm) | HFOV (°) | Fno |
|---|---|---|---|---|---|---|---|---|
| numerical value | 2.12 | −2.85 | 4.35 | 2.85 | 4.33 | 2.47 | 54.94 | 1.18 |

FIG. 4A illustrates the longitudinal aberration curve of the imaging lens assembly according to Embodiment 2, representing deviations of focal points of light of different wavelengths converged after passing through a lens assembly. FIG. 4B illustrates the astigmatic curve of the imaging lens assembly according to Embodiment 2, representing a curvature of the tangential image plane and a curvature of the sagittal image plane. FIG. 4C illustrates the distortion curve of the imaging lens assembly according to Embodiment 2, representing amounts of distortion at different viewing angles. It can be seen from FIGS. 4A-4C that the imaging lens assembly according to Embodiment 2 can achieve a good imaging quality.

Embodiment 3

Figure 5:
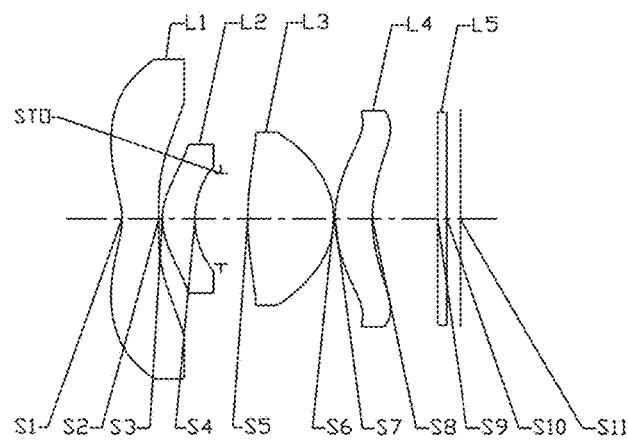
FIG. 5 is a schematic structural diagram illustrating an imaging lens assembly according to Embodiment 3 of the present disclosure.

An imaging lens assembly according to Embodiment 3 of the present disclosure is described below with reference to FIGS. 5-6C. FIG. 5 is a schematic structural diagram illustrating the imaging lens assembly according to Embodiment 3 of the present disclosure.

As shown in FIG. 5, the imaging lens assembly includes, sequentially along an optical axis from an object side to an image side, a first lens L1, a second lens L2, a third lens L3, a fourth lens L4, and an image plane S11. The imaging lens assembly may further include a photosensitive element disposed on the image plane S11.

The first lens L1 has a negative refractive power, an object-side surface S1 of the first lens L1 is a concave surface, and an image-side surface S2 of the first lens L1 is a convex surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is

TABLE 4

| surface number | surface type | radius of curvature | thickness | refractive index | abbe number | conic coefficient |
|---|---|---|---|---|---|---|
| OBJ | spherical | infinite | infinite | | | |
| S1 | aspheric | −1.6351 | 0.8404 | 1.53 | 55.8 | −9.9638 |
| S2 | aspheric | 25.0907 | 0.0500 | | | −4.2257 |
| S3 | aspheric | 1.2925 | 0.7981 | 1.62 | 23.5 | −1.5677 |
| S4 | aspheric | 1.8989 | 0.5363 | | | −3.0417 |
| STO | spherical | infinite | 0.5908 | | | |
| S5 | aspheric | 6.2775 | 2.0076 | 1.53 | 55.8 | −11.8823 |
| S6 | aspheric | −1.7810 | 0.0769 | | | −0.5463 |
| S7 | aspheric | 2.3082 | 0.7619 | 1.53 | 55.8 | −5.8041 |
| S8 | aspheric | 2.9396 | 1.5171 | | | −9.3152 |
| S9 | spherical | infinite | 0.2100 | 1.52 | 64.2 | |
| S10 | spherical | infinite | 0.3284 | | | |
| S11 | spherical | infinite | | | | |

TABLE 5

| surface number | A4 | A6 | A8 | A10 | A12 | A14 | A16 |
|---|---|---|---|---|---|---|---|
| S1 | 3.8449E−02 | −9.9796E−03 | 1.8777E−03 | −2.2314E−04 | 1.6022E−05 | −6.1816E−07 | 9.7029E−09 |
| S2 | 8.2259E−02 | −3.5945E−02 | 9.3429E−03 | −1.2620E−03 | 3.5224E−05 | 8.7741E−06 | −6.5058E−07 |
| S3 | −6.7926E−02 | 8.6020E−02 | −8.3997E−02 | 4.3788E−02 | −1.3274E−02 | 2.2629E−03 | −1.6846E−04 |
| S4 | 5.4191E−02 | −9.6357E−02 | 3.9374E−01 | −7.5058E−01 | 7.5523E−01 | −3.8767E−01 | 8.2335E−02 |
| S5 | −3.5039E−03 | −1.1097E−04 | −1.9807E−03 | 1.8783E−03 | −8.8957E−04 | 2.2841E−04 | −2.2260E−05 |
| S6 | −7.4744E−03 | −9.3078E−03 | 2.2390E−02 | −1.6684E−02 | 6.1923E−03 | −1.1695E−03 | 8.9810E−05 |
| S7 | 2.3178E−03 | −1.6282E−02 | 1.0797E−02 | −4.0245E−03 | 7.5234E−04 | −7.1217E−05 | 2.7274E−06 |
| S8 | 3.2462E−02 | −3.5755E−02 | 2.3421E−02 | −8.3120E−03 | 1.5393E−03 | −1.4423E−04 | 5.4115E−06 | a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the imaging lens assembly may further include an optical filter L5 having an object-side surface S9 and an image-side surface S10. Light from an object sequentially passes through the surfaces S1-S10 and finally forms an image on the image plane S11.

Alternatively, the imaging lens assembly may further include a diaphragm STO disposed between the second lens L2 and the third lens L3, to improve the imaging quality of the imaging lens assembly.

Table 7 shows the surface type, the radius of curvature, the thickness, the material and the conic coefficient of each lens of the imaging lens assembly in Embodiment 3. The units of the radius of curvature and the thickness both are millimeters (mm). Table 8 shows the high-order coefficients applicable to each aspheric surface in Embodiment 3. The surface type of each aspheric surface may be defined by the formula (1) given in Embodiment 1. Table 9 shows the total effective focal length f of the imaging lens assembly, the effective focal lengths f1-f4 of the lenses, the half of the diagonal length ImgH of the effective pixel area of the photosensitive element on the image plane S11 of the imaging lens assembly, the half of the maximal field-of-view HFOV of the imaging lens assembly, and the F-number Fno of the imaging lens assembly in Embodiment 3.

TABLE 9

| parameter | f (mm) | f1 (mm) | f2 (mm) | f3 (mm) | f4 (mm) | ImgH (mm) | HFOV (°) | Fno |
|---|---|---|---|---|---|---|---|---|
| numerical value | 2.12 | −3.22 | 5.20 | 2.96 | 12.57 | 2.47 | 54.40 | 1.18 |

Figure 6A:
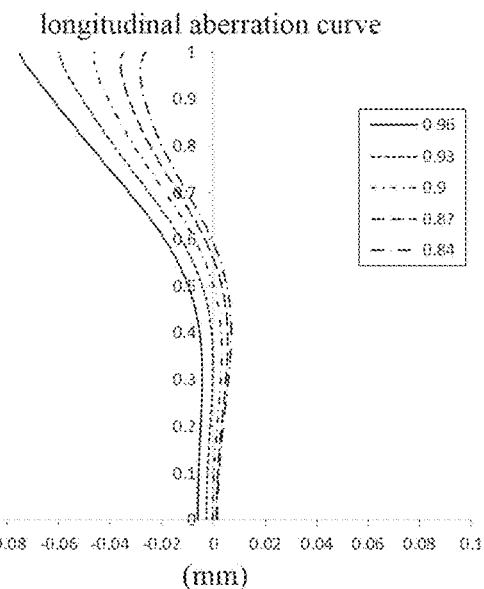
FIGS. 6A-6C respectively illustrate a longitudinal aberration curve, an astigmatic curve, and a distortion curve of the imaging lens assembly according to Embodiment 3.
Figure 6B:
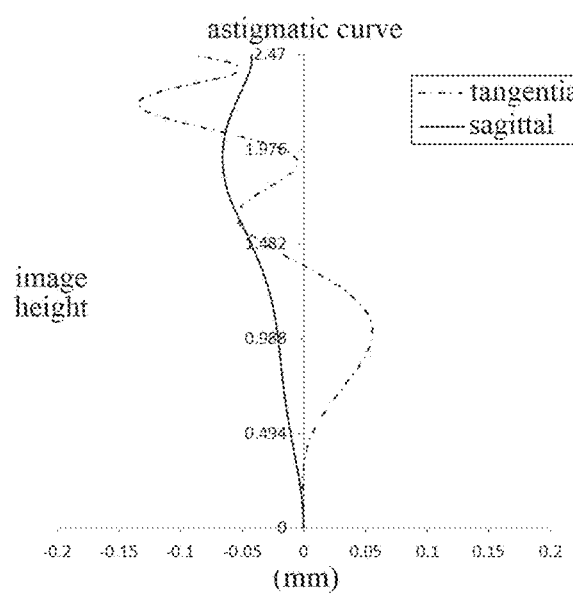
Figure 6C:
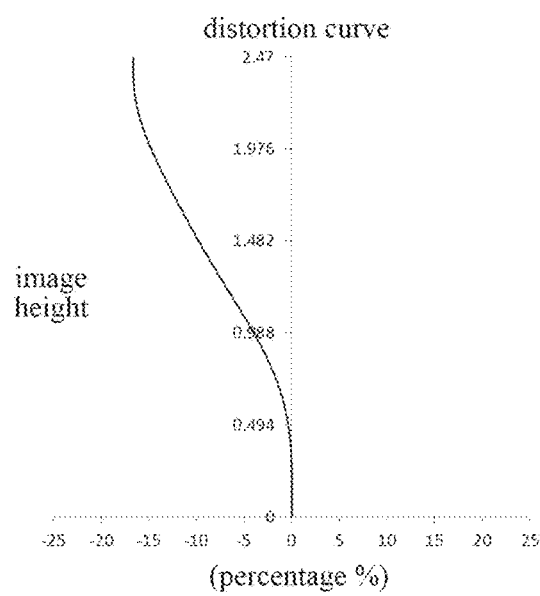

FIG. 6A illustrates the longitudinal aberration curve of the imaging lens assembly according to Embodiment 3, representing deviations of focal points of light of different wavelengths converged after passing through a lens assembly. FIG. 6B illustrates the astigmatic curve of the imaging lens assembly according to Embodiment 3, representing a curvature of the tangential image plane and a curvature of the sagittal image plane. FIG. 6C illustrates the distortion curve of the imaging lens assembly according to Embodiment 3, representing amounts of distortion at different viewing angles. It can be seen from FIGS. 6A-6C that the imaging lens assembly according to Embodiment 3 can achieve a good imaging quality.

Embodiment 4

Figure 7:
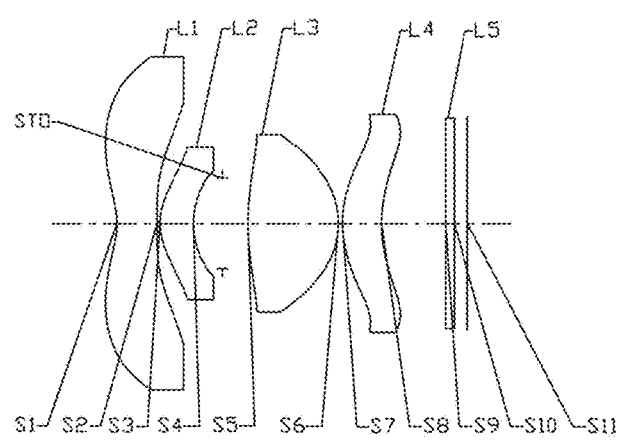
FIG. 7 is a schematic structural diagram illustrating an imaging lens assembly according to Embodiment 4 of the present disclosure.

An imaging lens assembly according to Embodiment 4 of the present disclosure is described below with reference to FIGS. 7-8C. FIG. 7 is a schematic structural diagram illustrating the imaging lens assembly according to Embodiment 4 of the present disclosure.

As shown in FIG. 7, the imaging lens assembly includes, sequentially along an optical axis from an object side to an image side, a first lens L1, a second lens L2, a third lens L3, a fourth lens L4, and an image plane S11. The imaging lens assembly may further include a photosensitive element disposed on the image plane S11.

The first lens L1 has a negative refractive power, an object-side surface S1 of the first lens L1 is a concave surface, and an image-side surface S2 of the first lens L1 is a convex surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is

TABLE 7

| surface number | surface type | radius of curvature | thickness | refractive index | abbe number | conic coefficient |
|---|---|---|---|---|---|---|
| OBJ | spherical | infinite | infinite | | | |
| S1 | aspheric | −1.6820 | 0.8516 | 1.53 | 55.8 | −9.7555 |
| S2 | aspheric | −107.1318 | 0.0790 | | | −95.1368 |
| S3 | aspheric | 1.3721 | 0.7687 | 1.62 | 23.5 | −1.6427 |
| S4 | aspheric | 1.8804 | 0.5977 | | | −3.1739 |
| STO | spherical | infinite | 0.6209 | | | |
| S5 | aspheric | 6.3976 | 1.9829 | 1.53 | 55.8 | −10.6272 |
| S6 | aspheric | −1.8668 | 0.0300 | | | −0.5329 |
| S7 | aspheric | 2.4322 | 0.8604 | 1.53 | 55.8 | −5.9114 |
| S8 | aspheric | 3.3485 | 1.5084 | | | −10.0620 |
| S9 | spherical | infinite | 0.2100 | 1.52 | 64.2 | |
| S10 | spherical | infinite | 0.3197 | | | |
| S11 | spherical | infinite | | | | |

TABLE 8

| surface number | A4 | A6 | A8 | A10 | A12 | A14 | A16 |
|---|---|---|---|---|---|---|---|
| S1 | 3.4041E−02 | −8.0765E−03 | 1.4062E−03 | −1.5606E−04 | 1.0588E−05 | −3.9081E−07 | 5.9438E−09 |
| S2 | 7.3896E−02 | −2.8880E−02 | 6.8030E−03 | −8.6467E−04 | 3.3052E−05 | 3.3156E−06 | −2.6446E−07 |
| S3 | −6.5245E−02 | 7.1411E−02 | −6.3672E−02 | 2.9487E−02 | −7.5443E−03 | 1.0446E−03 | −6.3054E−05 |
| S4 | 2.3701E−02 | 2.6330E−02 | 2.4014E−02 | −1.1509E−01 | 1.4037E−01 | −7.4699E−02 | 1.6435E−02 |
| S5 | −1.8155E−03 | −2.2910E−03 | 9.2594E−04 | −2.4352E−04 | −3.1695E−05 | 3.6825E−05 | −4.7794E−06 |
| S6 | −1.0641E−02 | −4.9720E−03 | 1.5785E−02 | −1.1506E−02 | 4.0812E−03 | −7.3324E−04 | 5.3484E−05 |
| S7 | 2.0738E−02 | −1.3888E−02 | 8.7375E−03 | −3.1144E−03 | 5.5258E−04 | −4.8435E−05 | 1.6643E−06 |
| S8 | 3.2409E−02 | −3.4198E−02 | 2.1306E−02 | −7.3169E−03 | 1.3322E−03 | −1.2372E−04 | 4.6292E−06 | a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the imaging lens assembly may further include an optical filter L5 having an object-side surface S9 and an image-side surface S10. Light from an object sequentially passes through the surfaces S1-S10 and finally forms an image on the image plane S11.

Alternatively, the imaging lens assembly may further include a diaphragm STO disposed between the second lens L2 and the third lens L3, to improve the imaging quality of the imaging lens assembly.

Table 10 shows the surface type, the radius of curvature, the thickness, the material and the conic coefficient of each lens of the imaging lens assembly in Embodiment 4. The units of the radius of curvature and the thickness both are millimeters (mm). Table 11 shows the high-order coefficients applicable to each aspheric surface in Embodiment 4. The surface type of each aspheric surface may be defined by the formula (1) given in Embodiment 1. Table 12 shows the total effective focal length f of the imaging lens assembly, the effective focal lengths f1-f4 of the lenses, the half of the diagonal length ImgH of the effective pixel area of the photosensitive element on the image plane S11 of the imaging lens assembly, the half of the maximal field-of-view HFOV of the imaging lens assembly, and the F-number Fno of the imaging lens assembly in Embodiment 4.

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | −1.7709 | 0.9414 | 1.53 | 55.8 | −9.7701 |
| S2 | aspheric | −182.2099 | 0.0691 | | | −99.0000 |
| S3 | aspheric | 1.4237 | 0.7984 | 1.62 | 23.5 | −1.6239 |
| S4 | aspheric | 1.8945 | 0.6804 | | | −2.9793 |
| STO | spherical | infinite | 0.6006 | | | |
| S5 | aspheric | 6.1600 | 2.1211 | 1.53 | 55.8 | −10.7189 |
| S6 | aspheric | −1.9486 | 0.0944 | | | −0.5340 |
| S7 | aspheric | 2.6020 | 0.9167 | 1.62 | 23.5 | −5.8551 |
| S8 | aspheric | 3.3559 | 1.5026 | | | −9.5752 |
| S9 | spherical | infinite | 0.2100 | 1.52 | 64.2 | |
| S10 | spherical | infinite | 0.3140 | | | |
| S11 | spherical | infinite | | | | |

TABLE 11

| surface number | A4 | A6 | A8 | A10 | A12 | A14 | A16 |
|---|---|---|---|---|---|---|---|
| S1 | 2.8739E−02 | −6.1233E−03 | 9.6121E−04 | −9.6462E−05 | 5.9186E−06 | −1.9757E−07 | 2.7192E−09 |
| S2 | 6.3029E−02 | −2.2036E−02 | 4.6203E−03 | −5.1530E−04 | 1.4796E−05 | 1.9973E−06 | −1.3160E−07 |
| S3 | −5.6471E−02 | 5.5893E−02 | −4.5245E−02 | 1.9012E−02 | −4.4110E−03 | 5.5396E−04 | −3.0330E−05 |
| S4 | 2.1847E−02 | 2.0877E−02 | 1.7126E−02 | −7.3726E−02 | 8.2071E−02 | −3.9615E−02 | 7.9054E−03 |
| S5 | −1.5473E−03 | −1.7787E−03 | 6.6067E−04 | −1.5738E−04 | −1.8532E−05 | 1.9529E−05 | −2.2990E−06 |
| S6 | −9.2307E−03 | −3.8929E−03 | 1.1223E−03 | −7.4150E−03 | 2.3862E−03 | −3.8885E−04 | 2.5727E−05 |
| S7 | 1.7890E−02 | −1.0394E−02 | 5.9957E−03 | −2.0056E−03 | 3.3013E−04 | −2.6469E−05 | 8.2318E−07 |
| S8 | 2.7708E−02 | −2.5173E−02 | 1.4634E−02 | −4.8433E−03 | 8.4749E−04 | −7.5141E−05 | 2.6717E−06 |

TABLE 12

| parameter | f (mm) | f1 (mm) | f2 (mm) | f3 (mm) | f4 (mm) | ImgH (mm) | HFOV (°) | Fno |
|---|---|---|---|---|---|---|---|---|
| numerical value | 2.15 | −3.36 | 5.62 | 3.06 | 12.79 | 2.47 | 54.24 | 1.18 |

Figure 8A:
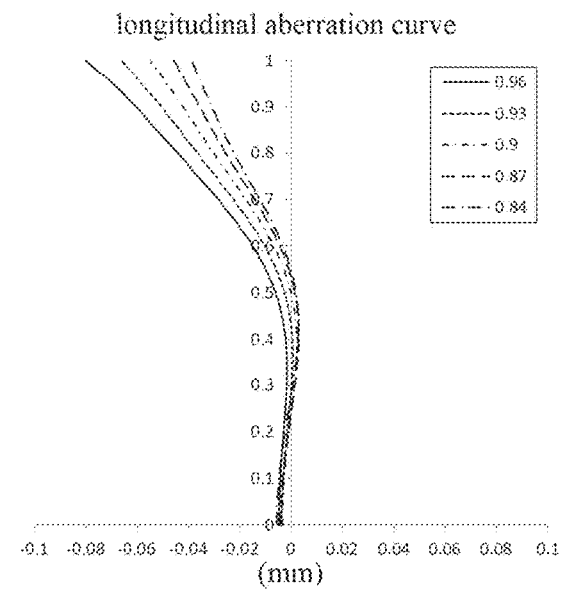
FIGS. 8A-8C respectively illustrate a longitudinal aberration curve, an astigmatic curve, and a distortion curve of the imaging lens assembly according to Embodiment 4.
Figure 8B:
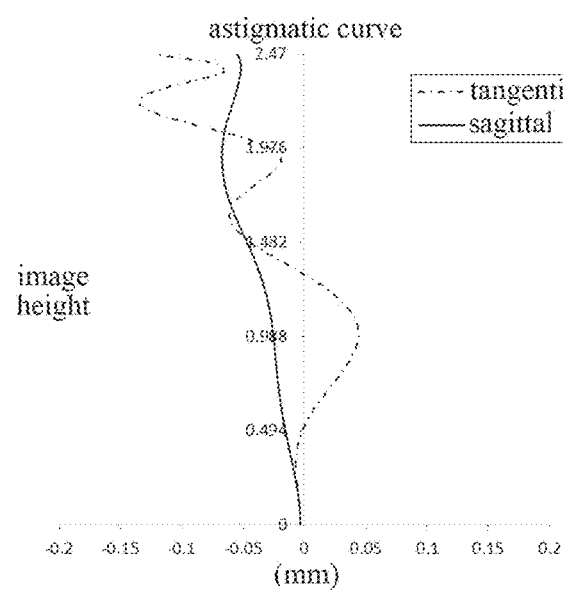
Figure 8C:
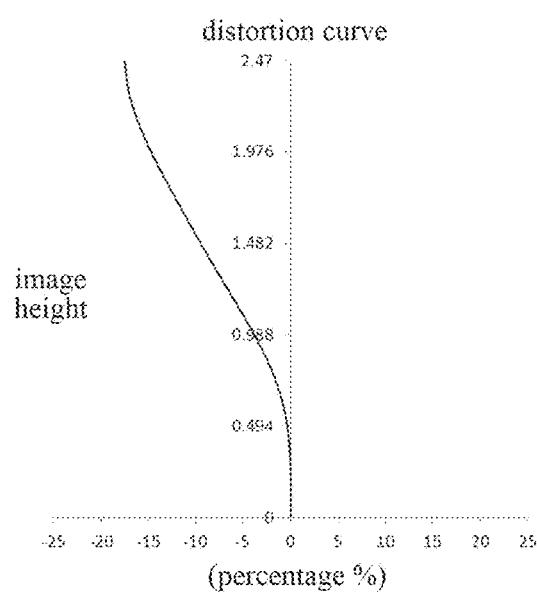

FIG. 8A illustrates the longitudinal aberration curve of the imaging lens assembly according to Embodiment 4, representing deviations of focal points of light of different wavelengths converged after passing through the lens assembly. FIG. 8B illustrates the astigmatic curve of the imaging lens assembly according to Embodiment 4, representing a curvature of the tangential image plane and a curvature of the sagittal image plane. FIG. 8C illustrates the distortion curve of the imaging lens assembly according to Embodiment 4, representing amounts of distortion at different viewing angles. It can be seen from FIGS. 8A-8C that the imaging lens assembly according to Embodiment 4 can achieve a good imaging quality.

Embodiment 5

Figure 9:
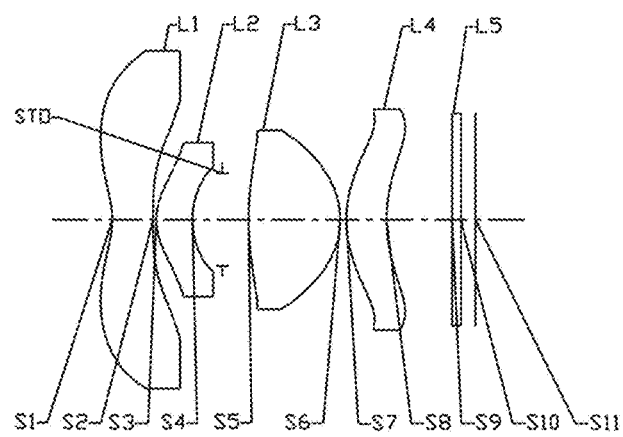
FIG. 9 is a schematic structural diagram illustrating an imaging lens assembly according to Embodiment 5 of the present disclosure.

An imaging lens assembly according to Embodiment 5 of the present disclosure is described below with reference to FIGS. 9-10C. FIG. 9 is a schematic structural diagram illustrating the imaging lens assembly according to Embodiment 5 of the present disclosure.

As shown in FIG. 9, the imaging lens assembly includes, sequentially along an optical axis from an object side to an image side, a first lens L1, a second lens L2, a third lens L3, a fourth lens L4, and an image plane S11. The imaging lens assembly may further include a photosensitive element disposed on the image plane S11.

The first lens L1 has a negative refractive power, an object-side surface S1 of the first lens L1 is a concave surface, and an image-side surface S2 of the first lens L1 is a convex surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the imaging lens assembly may further include an optical filter L5 having an object-side surface S9 and an image-side surface S10. Light from an object sequentially passes through the surfaces S1-S10 and finally forms an image on the image plane S11.

Alternatively, the imaging lens assembly may further include a diaphragm STO disposed between the second lens L2 and the third lens L3, to improve the image quality of the imaging lens assembly.

Table 13 shows the surface type, the radius of curvature, the thickness, the material and the conic coefficient of each lens of the imaging lens assembly in Embodiment 5. The units of the radius of curvature and the thickness both are millimeters (mm). Table 14 shows the high-order coefficients applicable to each aspheric surface in Embodiment 5. The surface type of each aspheric surface may be defined by the formula (1) given in Embodiment 1. Table 15 shows the total effective focal length f of the imaging lens assembly, the effective focal lengths f1-f4 of the lenses, the half of the diagonal length ImgH of the effective pixel area of the photosensitive element on the image plane S11 of the imaging lens assembly, the half of the maximal field-of-view HFOV of the imaging lens assembly, and the F-number Fno of the imaging lens assembly in Embodiment 5.

TABLE 13

| surface number | surface type | radius of curvature | thickness | material refractive index | abbe number | conic coefficient |
|---|---|---|---|---|---|---|
| OBJ | spherical | infinite | infinite | | | |
| S1 | aspheric | −1.7698 | 0.9534 | 1.53 | 55.8 | −9.8763 |
| S2 | aspheric | −487.3160 | 0.0744 | | | 50.0000 |
| S3 | aspheric | 1.3800 | 0.8574 | 1.53 | 55.8 | −1.6804 |
| S4 | aspheric | 1.8407 | 0.7012 | | | −2.6960 |
| STO | spherical | infinite | 0.6111 | | | |
| S5 | aspheric | 6.2261 | 2.1416 | 1.53 | 55.8 | −10.5679 |
| S6 | aspheric | −1.9498 | 0.1425 | | | −0.5322 |
| S7 | aspheric | 2.6213 | 0.9402 | 1.62 | 23.5 | −5.8571 |
| S8 | aspheric | 3.4042 | 1.5337 | | | −10.0865 |
| S9 | spherical | infinite | 0.2100 | 1.52 | 64.2 | |
| S10 | spherical | infinite | 0.3451 | | | |
| S11 | spherical | infinite | | | | |

TABLE 15

| parameter | f (mm) | f1 (mm) | f2 (mm) | f3 (mm) | f4 (mm) | ImgH (mm) | HFOV (°) | Fno |
|---|---|---|---|---|---|---|---|---|
| numerical value | 2.10 | −3.34 | 6.28 | 3.07 | 12.63 | 2.47 | 55.12 | 1.19 |

Figure 10A:
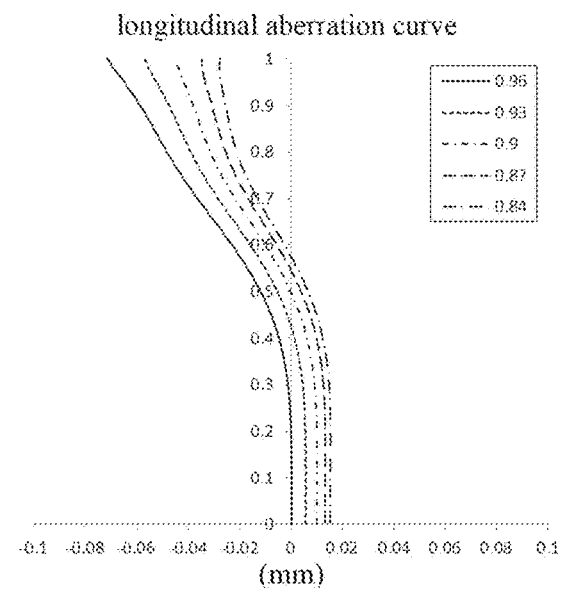
FIGS. 10A-10C respectively illustrate a longitudinal aberration curve, an astigmatic curve, and a distortion curve of the imaging lens assembly according to Embodiment 5.
Figure 10B:
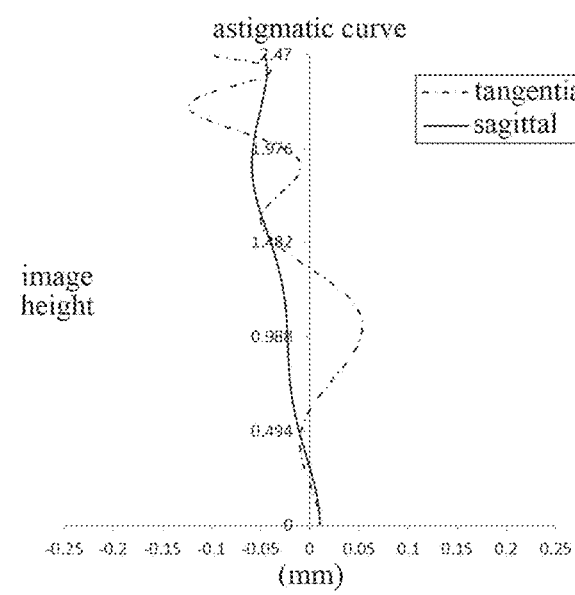
Figure 10C:
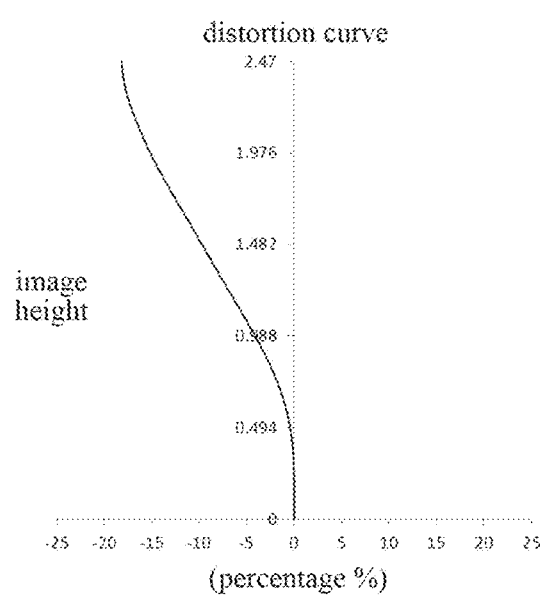

FIG. 10A illustrates the longitudinal aberration curve of the imaging lens assembly according to Embodiment 5, representing deviations of focal points of light of different wavelengths converged after passing through the lens assembly. FIG. 10B illustrates the astigmatic curve of the imaging lens assembly according to Embodiment 5, representing a curvature of the tangential image plane and a curvature of the sagittal image plane. FIG. 10C illustrates the distortion curve of the imaging lens assembly according to Embodiment 5, representing amounts of distortion at different viewing angles. It can be seen from FIGS. 10A-10C that the imaging lens assembly according to Embodiment 5 can achieve a good imaging quality.

Embodiment 6

Figure 11:
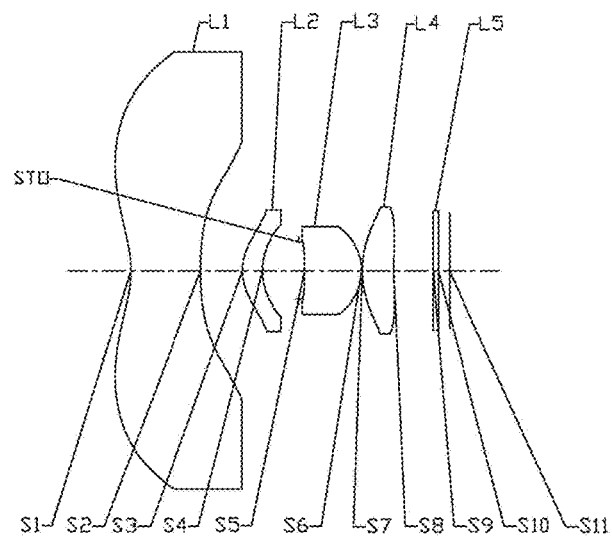
FIG. 11 is a schematic structural diagram illustrating an imaging lens assembly according to Embodiment 6 of the present disclosure.

An imaging lens assembly according to Embodiment 6 of the present disclosure is described below with reference to FIGS. 11-12C. FIG. 11 is a schematic structural diagram illustrating the imaging lens assembly according to Embodiment 6 of the present disclosure.

As shown in FIG. 11, the imaging lens assembly includes, sequentially along an optical axis from an object side to an image side, a first lens L1, a second lens L2, a third lens L3, a fourth lens L4, and an image plane S11. The imaging lens assembly may further include a photosensitive element disposed on the image plane S11.

The first lens L1 has a negative refractive power, an object-side surface S1 of the first lens L1 is a concave surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a concave surface, and an image-side surface S6 of the third lens L3 is a convex surface. The object-side surface S5 and the image-side surface S6 of the third lens L3 are both aspheric surfaces.

TABLE 14

| surface number | A4 | A6 | A8 | A10 | A12 | A14 | A16 |
|---|---|---|---|---|---|---|---|
| S1 | 2.7718E−02 | −5.7673E−03 | 8.7383E−04 | −8.4358E−05 | 4.9687E−06 | −1.5908E−07 | 2.0995E−09 |
| S2 | 6.6613E−02 | −2.3884E−02 | 5.1463E−03 | −5.9107E−04 | 1.7962E−05 | 2.3107E−06 | −1.5741E−07 |
| S3 | −5.7427E−02 | 5.5743E−02 | −4.5264E−02 | 1.9010E−02 | −4.4110E−03 | 5.5396E−04 | −3.0330E−05 |
| S4 | 2.5305E−02 | 2.3294E−02 | 1.8381E−02 | −7.2852E−02 | 8.2071E−02 | −3.9615E−02 | 7.9054E−03 |
| S5 | −1.5040E−03 | −1.7641E−03 | 6.6516E−04 | −1.5659E−04 | −1.8532E−05 | 1.9529E−05 | −2.2990E−06 |
| S6 | −9.4060E−03 | −3.9030E−03 | 1.1226E−03 | −7.4140E−03 | 2.3862E−03 | −3.8885E−04 | 2.5727E−05 |
| S7 | 1.7037E−02 | −1.0356E−02 | 6.4613E−03 | −2.2809E−03 | 4.0137E−04 | −3.5300E−05 | 1.2480E−06 |
| S8 | 2.2279E−02 | −1.8947E−02 | 1.1330E−02 | −3.8602E−03 | 6.8129E−04 | −6.0241E−05 | 2.1222E−06 |

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the imaging lens assembly may further include an optical filter L5 having an object-side surface S9 and an image-side surface S10. Light from an object sequentially passes through the surfaces S1-S10 and finally forms an image on the image plane S11.

Alternatively, the imaging lens assembly may further include a diaphragm STO disposed between the second lens L2 and the third lens L3, to improve the image quality of the imaging lens assembly.

Table 16 shows the surface type, the radius of curvature, the thickness, the material and the conic coefficient of each lens of the imaging lens assembly in Embodiment 6. The units of the radius of curvature and the thickness both are millimeters (mm). Table 17 shows the high-order coefficients applicable to each aspheric mirror surface in Embodiment 6. The surface type of each aspheric surface may be defined by the formula (1) given in Embodiment 1. Table 18 shows the total effective focal length f of the imaging lens assembly, the effective focal lengths f1-f4 of the lenses, the half of the diagonal length ImgH of the effective pixel area of the photosensitive element on the image plane S11 of the imaging lens assembly, the half of the maximal field-of-view HFOV of the imaging lens assembly, and the F-number Fno of the imaging lens assembly in Embodiment 6.

TABLE 16

| surface number | surface type | radius of curvature | thickness | material refractive index | material abbe number | conic coefficient |
|---|---|---|---|---|---|---|
| OBJ | spherical | infinite | infinite | | | |
| S1 | aspheric | −4.4045 | 2.9349 | 1.53 | 55.8 | −8.7114 |
| S2 | aspheric | 12.8666 | 1.7622 | | | 4.2781 |
| S3 | aspheric | 2.1433 | 0.8370 | 1.62 | 23.5 | −1.1768 |
| S4 | aspheric | 2.5319 | 1.5153 | | | −1.5717 |
| STO | spherical | infinite | 0.2500 | | | |
| S5 | aspheric | −35.5918 | 2.3914 | 1.53 | 55.8 | −53.4095 |
| S6 | aspheric | −2.1334 | 0.0300 | | | −0.2921 |
| S7 | aspheric | 4.0031 | 1.3208 | 1.53 | 55.8 | −4.2091 |
| S8 | aspheric | 42.4476 | 1.6562 | | | −84.7048 |
| S9 | spherical | infinite | 0.2100 | 1.52 | 64.2 | |
| S10 | spherical | infinite | 0.4676 | | | |
| S11 | spherical | infinite | | | | |

TABLE 17

| surface number | A4 | A6 | A8 | A10 | A12 | A14 | A16 |
|---|---|---|---|---|---|---|---|
| S1 | 1.9718E−03 | −5.9872E−05 | 1.3738E−06 | −2.0188E−08 | 1.8318E−10 | −9.0868E−13 | 1.8610E−15 |
| S2 | 8.9741E−04 | 2.0456E−04 | −2.8671E−05 | 1.9978E−06 | −9.1792E−08 | 2.3424E−09 | −2.4562E−11 |
| S3 | −4.5583E−03 | −7.3360E−04 | −1.0113E−04 | 1.1166E−05 | 6.3833E−07 | 1.3451E−08 | −6.2109E−09 |
| S4 | 3.8413E−03 | −6.1074E−04 | 2.3076E−04 | −2.4060E−05 | 5.1255E−06 | 1.5991E−06 | 8.4883E−09 |
| S5 | −2.1058E−02 | −3.6099E−03 | −1.8812E−03 | 2.0402E−04 | 2.5480E−05 | −3.0362E−04 | 7.9197E−10 |
| S6 | 8.2651E−04 | −1.2477E−03 | 1.5462E−04 | 4.9745E−05 | −1.7945E−05 | −3.1353E−06 | 4.9624E−07 |
| S7 | 4.2604E−03 | −4.3025E−04 | 2.0930E−05 | −4.1380E−06 | 3.0571E−07 | −3.2174E−08 | 4.2209E−09 |
| S8 | −9.0579E−04 | −4.3014E−04 | −2.5524E−05 | −2.2732E−06 | 4.3794E−07 | 3.2149E−08 | −2.1241E−09 |

TABLE 18

| parameter | f (mm) | f1 (mm) | f2 (mm) | f3 (mm) | f4 (mm) | ImgH (mm) | HFOV (°) | Fno |
|---|---|---|---|---|---|---|---|---|
| numerical value | 1.89 | −5.81 | 12.38 | 4.16 | 8.20 | 2.47 | 51.77 | 1.18 |

Figure 12A:
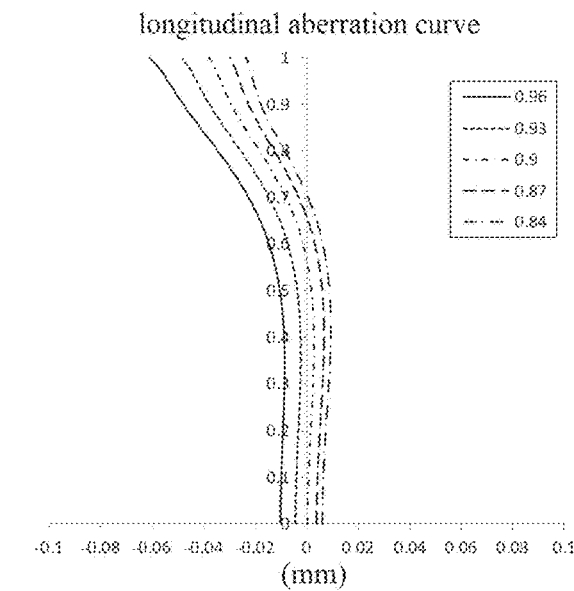
FIGS. 12A-12C respectively illustrate a longitudinal aberration curve, an astigmatic curve, and a distortion curve of the imaging lens assembly according to Embodiment 6.
Figure 12B:
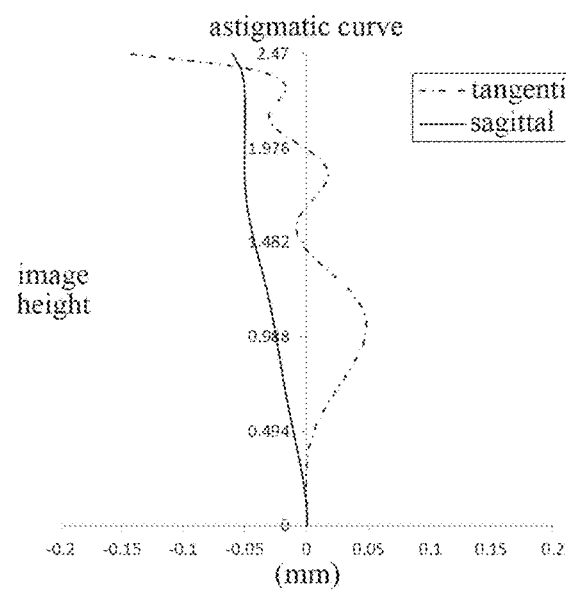
Figure 12C:
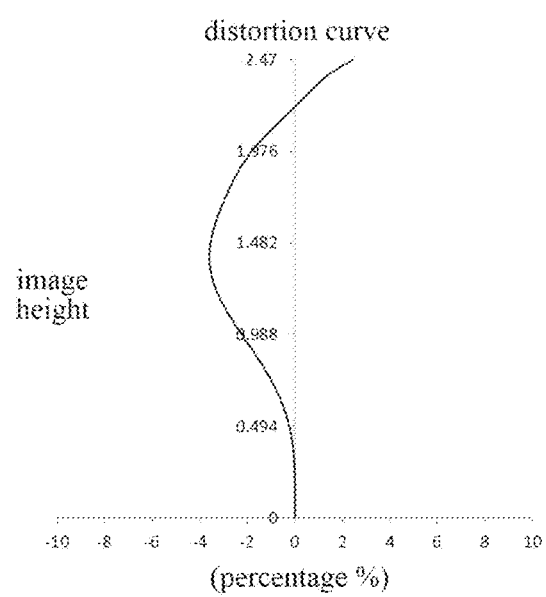

FIG. 12A illustrates the longitudinal aberration curve of the imaging lens assembly according to Embodiment 6, representing deviations of focal points of light of different wavelengths converged after passing through the lens assembly. FIG. 12B illustrates the astigmatic curve of the imaging lens assembly according to Embodiment 6, representing a curvature of the tangential image plane and a curvature of the sagittal image plane. FIG. 12C illustrates the distortion curve of the imaging lens assembly according to Embodiment 6, representing amounts of distortion at different viewing angles. It can be seen from FIGS. 12A-12C that the imaging lens assembly according to Embodiment 6 can achieve a good imaging quality.

To sum up, Embodiments 1-6 respectively satisfy the relationships shown in Table 19 below.

TABLE 19

| Conditional Expression | Embodiment 1 | 2 | 3 | 4 | 5 | 6 |
|---|---|---|---|---|---|---|
| f/EPD | 1.18 | 1.18 | 1.18 | 1.18 | 1.19 | 1.18 |
| f3/f4 | 0.30 | 0.66 | 0.24 | 0.24 | 0.24 | 0.51 |
| ImgH/f | 1.18 | 1.17 | 1.17 | 1.15 | 1.17 | 1.30 |
| f12/f | −3.43 | −3.56 | −3.67 | −3.55 | −3.05 | −7.56 |
| |f3/f| | 1.49 | 1.35 | 1.40 | 1.42 | 1.46 | 2.19 |
| R3/R6 | −0.80 | −0.73 | −0.73 | −0.73 | −0.71 | −1.00 |
| R6/f | −0.95 | −0.84 | −0.88 | −0.91 | −0.93 | −1.13 |
| R6/f3 | −0.64 | −0.62 | −0.63 | −0.64 | −0.64 | −0.51 |
| ET4/CT4 | 0.64 | 0.82 | 0.61 | 0.65 | 0.64 | 0.31 |

The present disclosure further provides an imaging device having a photosensitive element which may be a photosensitive charge-coupled device (CCD) or complementary metal-oxide semiconductor (CMOS) element. The imaging device may be an independent imaging device such as a digital camera, or may be an imaging module integrated in a mobile electronic device such as a mobile phone. The imaging device is equipped with the imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. An imaging lens assembly comprising, sequentially along an optical axis from an object side to an image side, a first lens, a second lens, a third lens, and a fourth lens,
   wherein an object-side surface of the first lens is a concave surface, and an image-side surface of the fourth lens is a concave surface;
   the second lens has a positive refractive power;
   at least one of the first lens, the third lens, or the fourth lens has a negative refractive power; and
   an effective focal length f3 of the third lens and an effective focal length f4 of the fourth lens satisfy: f3/f4>0,
   a total effective focal length f of the imaging lens assembly and an entrance pupil diameter EPD of the imaging lens assembly satisfy: f/EPD<2 wherein at least one of an image-side surface or the object-side surface of the first lens has at least one inflection point.

2. The imaging lens assembly according to claim 1, wherein the effective focal length f3 of the third lens and the effective focal length f4 of the fourth lens satisfy: 0<f3/f4<1.

3. The imaging lens assembly according to claim 1, wherein half of a diagonal length ImgH of an effective pixel area on an image plane of the imaging lens assembly and a total effective focal length f of the imaging lens assembly satisfy: ImgH/f>1.

4. The imaging lens assembly according to claim 1, wherein the effective focal length f3 of the third lens and the total effective focal length f of the imaging lens assembly satisfy: 1.2<|f3/f|<2.3.

5. The imaging lens assembly according to claim 1, wherein the first lens has a negative refractive power.

6. The imaging lens assembly according to claim 1, wherein a radius of curvature R3 of an object-side surface of the second lens and a radius of curvature R6 of an image-side surface of the third lens satisfy: −1.2<R3/R6<−0.5.

7. The imaging lens assembly according to claim 1, wherein at least one of an image-side surface or the object-side surface of the first lens has at least one inflection point.

8. The imaging lens assembly according to claim 1, wherein a radius of curvature R6 of an image-side surface of the third lens and the total effective focal length f of the imaging lens assembly satisfy: −1.2<R6/f<−0.7.

9. The imaging lens assembly according to claim 1, wherein an edge thickness ET4 of the fourth lens and a center thickness CT4 of the fourth lens on the optical axis satisfy: 0.3<ET4/CT4<0.9.

10. An imaging lens assembly comprising, sequentially along an optical axis from an object side to an image side, a first lens, a second lens, a third lens, and a fourth lens,
    wherein the first lens has a positive refractive power or a negative refractive power, and an object-side surface of the first lens is a concave surface;
    the second lens has a positive refractive power;
    the third lens has a positive refractive power or a negative refractive power;
    the fourth lens has a positive refractive power or a negative refractive power, and an image-side surface of the fourth lens is a concave surface; and
    a combined refractive power of the first lens and the second lens is a negative refractive power, and a combined focal length f12 of the first lens and the second lens and a total effective focal length f of the imaging lens assembly satisfy: −8<f12/f<−3.

11. The imaging lens assembly according to claim 10, wherein an effective focal length f3 of the third lens and the total effective focal length f of the imaging lens assembly satisfy: 1.2<|f3/f|<2.3.

12. The imaging lens assembly according to claim 11, wherein the effective focal length f3 of the third lens and an effective focal length f4 of the fourth lens satisfy: f3/f4>0.

13. The imaging lens assembly according to claim 12, wherein each of the third lens and the fourth lens has a positive refractive power.

14. The imaging lens assembly according to claim 13, wherein the effective focal length f3 of the third lens and the effective focal length f4 of the fourth lens satisfy: 0<f3/f4<1.

15. The imaging lens assembly according to claim 13, wherein a radius of curvature R6 of an image-side surface of the third lens and the effective focal length f3 of the third lens satisfy: −1<R6/f3<−0.5.

16. The imaging lens assembly according to claim 10, wherein a radius of curvature R3 of an object-side surface of the second lens and a radius of curvature R6 of an image-side surface of the third lens satisfy: −1.2<R3/R6<−0.5.

17. The imaging lens assembly according to claim 10, wherein half of a diagonal length ImgH of an effective pixel area on an image plane of the imaging lens assembly and the total effective focal length f of the imaging lens assembly satisfy: ImgH/f>1.

18. The imaging lens assembly according to claim 10, wherein the total effective focal length f of the imaging lens assembly and an entrance pupil diameter EPD of the imaging lens assembly satisfy: f/EPD<2.

* * * * *